R. BARTHOLOMEW.
STRETCHER COT FOR AUTOMOBILES.
APPLICATION FILED OCT. 31, 1921.

1,413,890.

Patented Apr. 25, 1922.

INVENTOR.
Ralph Bartholomew
BY
R. C. Lampkin
ATTORNEY.

UNITED STATES PATENT OFFICE.

RALPH BARTHOLOMEW, OF AVON, NEW YORK.

STRETCHER COT FOR AUTOMOBILES.

1,413,890.  Specification of Letters Patent.  Patented Apr. 25, 1922.

Application filed October 31, 1921. Serial No. 511,813.

*To all whom it may concern:*

Be it known that I, RALPH BARTHOLOMEW, a citizen of the United States, and a resident of Avon, in the county of Livingston and State of New York, have invented certain new and useful Improvements in Stretcher Cots for Automobiles, of which the following is a specification.

This invention relates to a stretcher cot for autobobiles, and especially to such a cot for use in automobiles of the sedan type, and its main object is to provide a device of this description which will be extremely simple and efficient and which may be put in place in a vehicle or removed therefrom as a whole, may be collapsed, made into a bundle taking up but little space, and which will require no changes to be made in the vehicle or its attachments in order that the device may be placed in position for use.

Another important object of the invention is to provide a cot of this description having means for adjusting the stretcher bottom to take up sagging due to wear, etc.

Other important features of the invention relate to means for connecting the principal members of the device, to means for permitting collapsing the same, to cushioning means on said members, etc.

Figure 1:
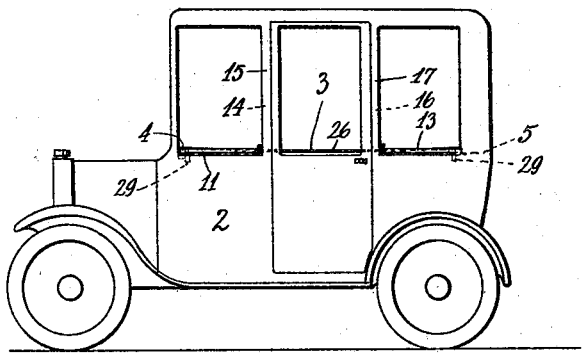
Figure 2:
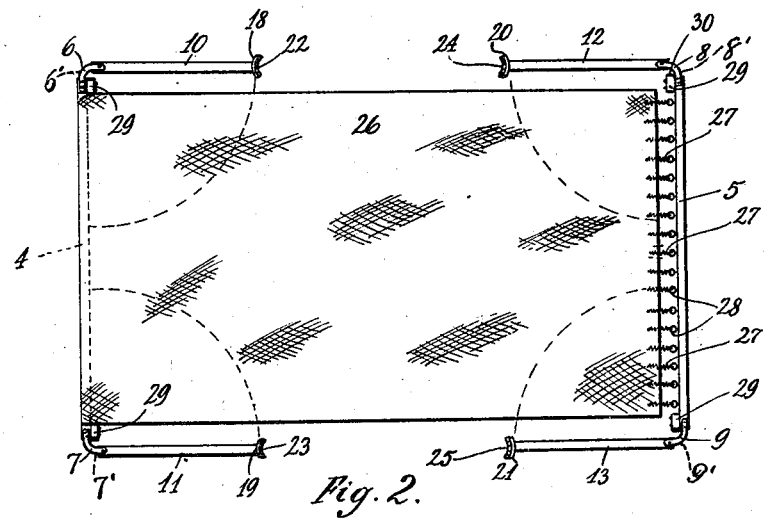
Figure 3:
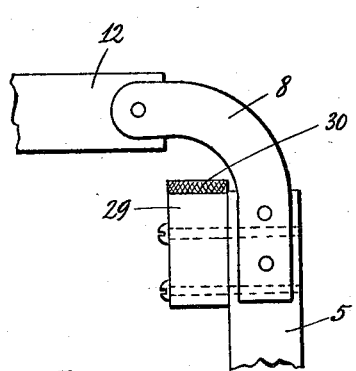
Figure 4:
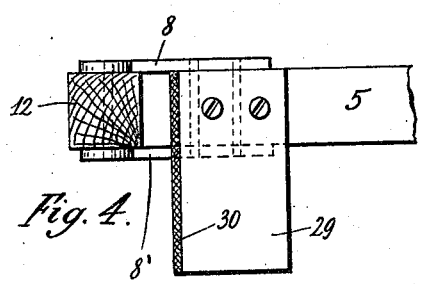

These and other important objects of the invention not hereinbefore referred to will be hereinafter described and claimed and are illustrated in the accompanying drawing, in which:

Figure 1 is a side view of an automobile of the sedan type equipped with my stretcher cot, the cot being shown in its extended position ready for use, Fig. 2 is a plan view of the cot as it appears when detached from the automobile, Fig. 3 is a detail showing the means employed for connecting the side and end frame members of the device for relative movement, and also means for preventing marring of the finish of the machine at contacting points, and Fig. 4 is a detail showing an end frame member with its downward projecting members for aiding positioning of the cot within the vehicle.

Similar characters designate like parts in all the figures of the drawing.

Referring to the drawings, 2 designates generally an automobile of the sedan type, having slung therein a stretcher cot 3 embodying my invention. The cot is adapted to be extended over substantially the entire length of the inside of the automobile body, and when so extended it affords full comfort to those using the vehicle as a sleeping car. As herein illustrated the front and rear frame members of the device, designated by 4 and 5, are adapted to rest upon the ledges of the forward and rear side windows respectively. These end members may be of wood or metal, as desired, and they extend substantially from side to side of the automobile body, and each has rigidly fixed thereto at each end a connecting device in the form of an upper and lower plate, designated by 6—6', 7—7', 8—8' and 9—9'. These plates may be as shown or of any other form desired. Pivoted to each pair of plates is a side member, shown at 10, 11, 12 and 13. These side members, as in the case of the end members 4 and 5, may be made of wood or metal and are adapted to rest upon and lie along the ledges of the side window frames, and they will be stopped from forward movement by the vertical sides 14, 15, 16 and 17 of said frames. The ends of the side members 10, 11, 12 and 13 are formed with forked ends, shown at 18, 19, 20 and 21, adapted to fit against the window frame, and these forked portions may be provided with cushioning means or pads, such as 22, 23, 24 and 25, adapted to prevent marring of the surface of the window ledges and frames. As thus constructed the front member 4 and the side members 10 and 11 form one end of the cot frame, and the back member 5 and the side members 12 and 13 form the other end of said frame. Attached to one of the end members, here shown as the member 5, is a canvas or other fabric member 26 which extends substantially the full length of the automobile body and to the end member 4, means being interposed between the member 5 and the fabric 26 for tensioning and adjusting the said fabric. This means may be of any suitable type, but is shown herein as composed of a series of adjustable spring members, each of said members being made up of a coiled spring 27 attached to the fabric of the cot bottom and a screw-eye 28 adapted to be screwed into the end rod 5. Additional positioning means 29 are shown for positively holding the cot in the desired place against the inside of the automobile. The means shown are short projections extending downward from each end of the front and back members 4 and 5. These projections may have padded portions, such as 30 to prevent marring of the finish of the automobile.

The pivot members 6 and 7 are so positioned as to permit folding back of the members 10 and 11 upon the member 4, while the side members 12 and 13 may be folded back on the member 5. When thus folded the canvas 26 may be folded or rolled upon one of the end members 4 and 5 and its side members until the whole length of the fabric is rolled thereon and the end members 4 and 5 contact. The device when thus arranged takes up a very small amount of space, and may be stowed away under the seat or wherever desired. It will be evident that the device may be put in operative position, or taken down and stowed away by any one very quickly, as all parts remain connected together, whether in position or folded up, and its entire weight need not be more than four or five pounds.

It will of course be obvious that such a cot may be furnished with the ordinary bed equipment, such as sheets, pillows, blankets, etc., thus providing a comfortable sleeping compartment when on tour or at any time that it may be desired to use the device.

What I claim is:

1. A stretcher cot for automobiles, embodying front and rear members adapted to rest upon the ledges of the forward and rear side windows respectively, side members connected to the ends of said front and rear members and adapted to rest upon and extend along the ledges of the side window frames, and connecting means between said front and rear members.

2. A stretcher cot for automobiles, embodying front and rear members adapted to rest upon the ledges of the forward and rear side windows respectively, side members pivoted to the ends of said front and rear members and adapted to rest upon and extend along the ledges of the side window frames, and connecting means between said front and rear members.

3. A stretcher cot for automobiles, embodying front and rear rods adapted to rest upon the ledges of the forward and rear side windows respectively, side rods pivoted to the ends of said front and rear rods and adapted to rest upon and extend along the ledges of the side window frames and be stopped in their movement by the vertical portions of said frames, and a fabric bottom for said cot connecting said front and rear rods.

4. A stretcher cot for automobiles, embodying front and rear rods adapted to rest upon the ledges of the forward and rear side windows respectively, side rods pivoted to the ends of said front and rear rods and adapted to rest upon and extend along the ledges of the side window frames, a fabric bottom for said cot connecting said front and rear rods, and adjusting means between said fabric and an end rod.

5. A stretcher cot for automobiles, embodying front and rear rods adapted to rest upon the ledges of the forward and rear side windows respectively, side rods pivoted to the ends of said front and rear rods and adapted to rest upon and extend along the ledges of the side window frames, cushioning means on said side rods, means for limiting the horizontal movement of said side rods, a fabric bottom for said cot connecting said front and rear rods, spring tensioning means connecting said fabric bottom and one of said end rods, and adjusting means between said fabric and an end rod.

6. A stretcher cot for automobiles, embodying front and rear rods adapted to rest upon the ledges of the forward and rear side windows respectively, downward projections on said rods adapted to position the cot in the vehicle, pads on said projections adapted to prevent marring of the surface contacting therewith, side rods pivoted to the ends of said front and rear rods and adapted to rest upon and extend along the ledges of the side window frames, cushioning means on said side rods, a fabric bottom for said cot connecting said front and rear rods, spring tensioning means connecting said fabric bottom and one of said end rods, and adjusting means between said fabric and an end rod.

Signed at Avon, in the county of Livingston, and State of New York, this 19 day of October, A. D. 1921.

RALPH BARTHOLOMEW.

Witnesses:
LULA BARTHOLOMEW,
WM. J. GILBERT.